(12) United States Patent
Verbrugh et al.

(10) Patent No.: US 9,229,145 B2
(45) Date of Patent: Jan. 5, 2016

(54) LIGHTING DEVICE

(75) Inventors: Stefan Marcus Verbrugh, Eindhoven (NL); Ralph Kurt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 18 days.

(21) Appl. No.: 13/505,105

(22) PCT Filed: Oct. 28, 2010

(86) PCT No.: PCT/IB2010/054892
§ 371 (c)(1),
(2), (4) Date: Apr. 30, 2012

(87) PCT Pub. No.: WO2011/055281
PCT Pub. Date: May 12, 2011

(65) Prior Publication Data
US 2012/0212971 A1    Aug. 23, 2012

(30) Foreign Application Priority Data

Nov. 4, 2009   (EP) ..................................... 09174986

(51) Int. Cl.
| F21V 8/00 | (2006.01) |
| H05B 33/08 | (2006.01) |
| F21W 131/105 | (2006.01) |
| F21W 131/406 | (2006.01) |
| F21Y 101/02 | (2006.01) |
| F21Y 113/00 | (2006.01) |
| G02B 6/04 | (2006.01) |
| F21V 29/74 | (2015.01) |

(52) U.S. Cl.
CPC .......... *G02B 6/0008* (2013.01); *H05B 33/0803* (2013.01); *F21V 29/74* (2015.01); *F21W 2131/105* (2013.01); *F21W 2131/406* (2013.01); *F21Y 2101/02* (2013.01); *F21Y 2113/005* (2013.01); *G02B 6/04* (2013.01)

(58) Field of Classification Search
CPC ............ F21V 23/0457; F21V 2200/13; F21V 220/10; F21V 29/74; F21Y 2113/005; F21W 2131/105; F21W 2131/406; G02B 6/005; G02B 6/04; F21S 10/023
USPC .................. 362/551, 552, 554, 555, 560, 276
See application file for complete search history.

(56) References Cited

U.S. PATENT DOCUMENTS

| 6,164,789 | A | 12/2000 | Unger | |
| 6,200,002 | B1 | 3/2001 | Marshall | |
| 6,513,962 | B1 * | 2/2003 | Mayshack et al. | ............ 362/583 |
| 6,655,825 | B2 | 12/2003 | Muthu | |
| 7,023,543 | B2 * | 4/2006 | Cunningham | ................ 356/300 |
| 7,056,000 | B2 * | 6/2006 | Hussey et al. | ................. 362/555 |

(Continued)

FOREIGN PATENT DOCUMENTS

| JP | 2006004862 A | 1/2006 |
| WO | 8202082 A1 | 6/1982 |

*Primary Examiner* — Sean Gramling
*Assistant Examiner* — Naomi M Wolford

(57) ABSTRACT

A lighting device comprising a plurality of light emitting elements (1), and a beam shaping optics (7) having an entrance aperture (6). Each light emitting element is optically connected to a set of optical fibers (5) each having a first end optically connected to the light emitting element and a second end optically connected to the entrance aperture (6), so as to guide collimated light from the light emitting element to the beam shaping optics (7). The light emitting elements are distributed over an area larger than the entrance aperture (6).

14 Claims, 2 Drawing Sheets

(56) References Cited

U.S. PATENT DOCUMENTS

| | | | |
|---|---|---|---|
| 7,319,298 B2* | 1/2008 | Jungwirth et al. | 315/307 |
| 7,345,312 B2* | 3/2008 | Kazakevich | 257/81 |
| 2003/0042493 A1 | 3/2003 | Kazakevich | |
| 2003/0112639 A1* | 6/2003 | Stack | 362/552 |
| 2004/0246742 A1 | 12/2004 | Toyota | |

* cited by examiner

LIGHTING DEVICE

FIELD OF THE INVENTION

The present invention relates to a lighting device, and particular to a spot lighting device for entertainment lighting applications.

BACKGROUND OF THE INVENTION

Light emitting elements with point shaped light emission, in particular solid state light emitting elements (e.g. LEDs), are being used more frequently in various lighting devices, including light fixtures for various entertainment lighting applications such as Theatre, TV Studio lighting and illumination at events like e.g. rock concerts.

Solid state light emitting elements have large advantages over conventional lamps in terms of energy efficiency and weight. Especially in temporary applications, such as lighting fixtures used during tours and events, the reduction of total weight is a key benefit of solid state lighting systems.

There are many LED systems on the market with red, green and blue LEDs, where each LED has an individual lens to form a narrow beam. Because in these systems the light is not sufficiently mixed, objects create multiple shadows. In addition, with this system architecture it is not possible to create a hard-edge spot, as is frequently used in entertainment.

It has been shown that a lighting system without these limitations can be created based on an array of 100-200 LEDs, connected to one optical system. This optical system is important to transform the Lambertian light distribution from the LEDs into the required beam shape (10°-40° FWHM, preferably zoomable, well defined beam profile). Such a system is disclosed in U.S. Pat. No. 6,200,002.

The optical system to transform the Lambertian light distribution of the LEDs into a beam usable e.g. in entertainment applications typically comprises a tubular reflector having an entrance aperture and an exit aperture being larger than the entrance aperture and a ratio between the exit aperture diameter and entrance aperture diameter in the range of 6 to 10. Since the total diameter of the system should not become larger than a few tens of cm, the light emitting elements must be confined to an area having a diameter in the order of a few cm.

The output flux of a LED array with a diameter of a few cm is limited by the heat transfer to the environment. In addition, the amount of LEDs is also limited by the package size of the existing efficient LEDs. In order to reach e.g. 10.000 lumen at the current LED efficacy of around 60 lm/W, around 150 W needs to be removed from a few $cm^2$. If this is to be done by a metal heat sink, the weight of the fixture will become large.

SUMMARY OF THE INVENTION

It is an object of the present invention to overcome, or at least mitigate, the above mentioned problem, and to provide a solid state based lighting device which is suitable for use in entertainment applications but without having an excessive weight.

According to the invention, this and other objects are achieved with a lighting device comprising a plurality of light emitting elements, and a beam shaping optics having an entrance aperture. Each light emitting element is optically connected to a set of optical fibers each having a first end optically connected to the light emitting element and a second end optically connected to the entrance aperture, so as to guide collimated light from the light emitting element to the beam shaping optics. The light emitting elements are distributed over an area larger than the entrance aperture.

By connecting the light emitting elements to the beam shaping optics using optical fibers, the light emitting elements may be spread out over a surface which is greater than the entrance aperture of the beam shaping optics. As a result, heat from the light emitting elements may be more easily dissipated also with a relatively light weight heat sink.

The improved cooling, and increased space available for wiring, further allows a large current through the LED. As a result, a large flux per area unit may be achieved, and thus a large flux from a small system.

By separating the light emitting elements repair and replacement of light emitting elements is facilitated. This is important especially entertainment solid state lighting systems, as risk for light emitting element failure can be comparably large due to the large number of light emitting elements and extreme operating currents.

The use of optical fibers to guide light from a LED to an optical component is known in the art, and described e.g. in document JP 2006004862. However, in prior art solutions, the fibers have not been used to concentrate light from light emitting elements spread out over a larger area onto a smaller entrance aperture.

A lighting device according to the present invention may have more than 100 light emitting elements, and the light emitting elements may be separated from each other by a distance of at least one centimeter.

The light emitting elements may include light emitting elements adapted to emit light of different colors. In a typical entertainment system, 4-8 different colors are used. In this case, the optical fibers of each set may be mixed with optical fibers of other set at the beam shaping optics entrance aperture. This improves color mixing. Preferably, the optical fibers are arranged in the entrance aperture of the beam shaping optics in such a way that fibers guiding the same LED color are substantially equally distributed.

The lighting device may further comprise a controller for controlling a flux of said light emitting elements, and a light sensor connected to the controller, wherein each set of optical fibers further comprises at least one optical fiber having a first end optically connected to the light emitting element and a second end optically connected to the light sensor. The light sensor can detect the flux from a light emitting element or group of light emitting elements and this information may be feedback to the flux controller.

In particular, such feedback may be used in a color system to detect the relative flux of different colors. In this case the light sensor may be controlled to detect different colors time sequentially. An advantage with this solution is that the feedback is insensitive to aging or deterioration of the light sensor. Alternatively, there may be a plurality of light sensors, and each light sensor can be connected only to optical fibers that are connected to light emitting elements having the same color.

Each light emitting element may further comprise a collimator arranged to collimate light emitted from the light emitting element. In this case, the first end of each optical fiber is optically connected to the collimator. The collimator will provide a first collimation of the light, facilitating in-coupling into the optical fibers.

According to one embodiment, the beam shaping optics comprises a tubular reflector with a reflective inner surface, a first end of the reflector forming the entrance aperture and a second end of the reflector forming an exit aperture which is larger than the entrance aperture.

It is noted that the invention relates to all possible combinations of features recited in the claims.

BRIEF DESCRIPTION OF THE DRAWINGS

This and other aspects of the present invention will now be described in more detail, with reference to the appended drawing showing an embodiment of the invention. Like numbers refer to like features throughout the drawings.

DETAILED DESCRIPTION

The present invention is applicable in various types of lighting systems, and will be described with reference to a lighting device suitable e.g. for entertainment applications. Such a lighting device is typically adapted to provide a comparably large light output, e.g. between 10000 and 100000 lumen, and preferably comprises optics to enable shaping of the beam.

Figure 1:
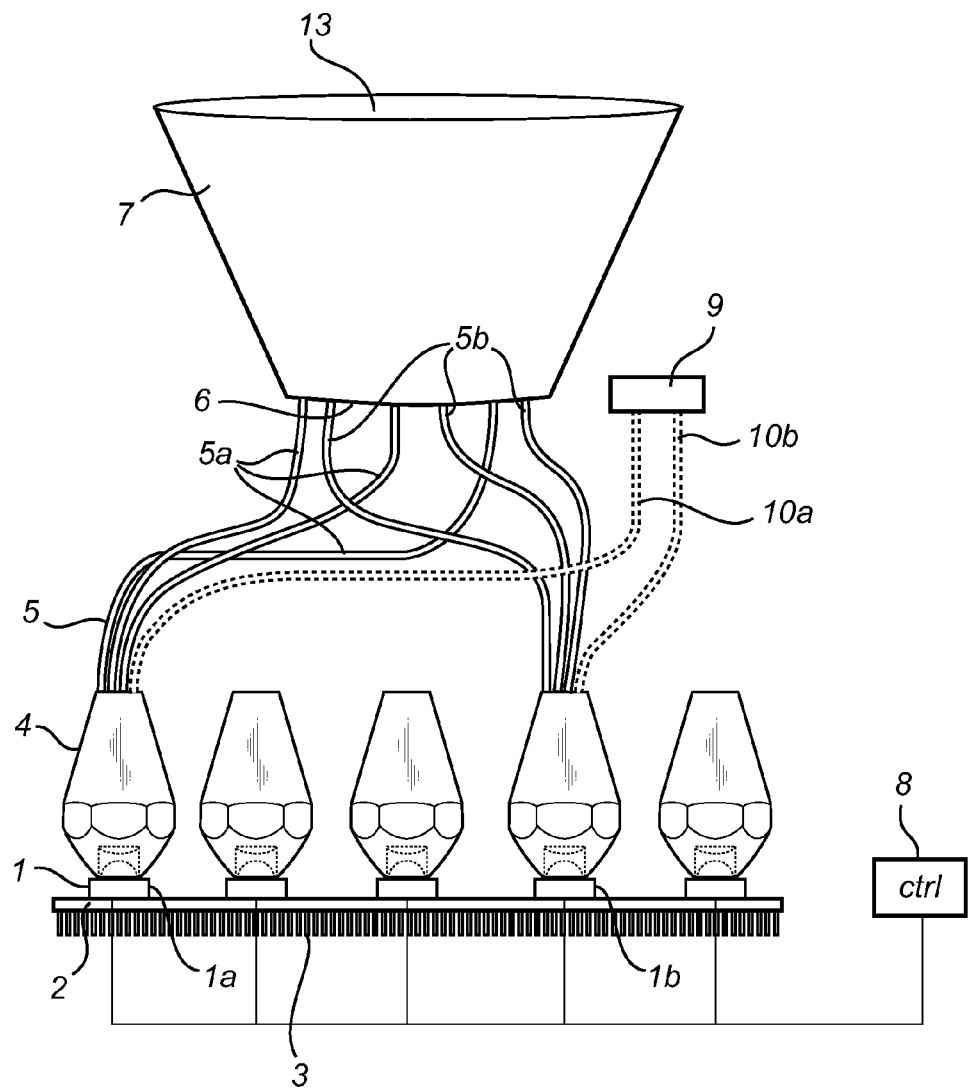
FIG. 1 shows a schematic view of a lighting device according to a first embodiment of the present invention.

The lighting device in FIG. 1 includes a plurality of light emitting elements, typically solid state light elements, and in the illustrated case LEDs 1, arranged on a substrate 2. The LEDs may be InGaN LEDs, which may be operated at higher temperature (current) than many other LEDs, such as AlInGaP LEDs.

The substrate 2 is provided with circuitry (not shown) for providing power and any control signals to the LEDs, and also a heat sink 3 to which the LEDs are thermally connected. The heat sink is adapted to dissipate heat generated by the LED. In the illustrated case the heat sink 3 is formed by relatively thin aluminum cooling fins, arranged on the back side of the substrate 2.

In a typical application, the device comprises 100-200 LEDs, but the number may also vary outside this range. The LEDs are separated from each other by a distance large enough to allow sufficient heat dissipation by the heat sink 3. As an example, the LEDs may be separated by a distance in the order of cm, e.g. 1 cm. If the device comprises e.g. 121 LEDs, arranged in a rectangular (square) 11×11 array, this may result in a size of 10 cm by 10 cm.

The device further comprises a plurality of collimators 4 arranged on top of each light emitting element. Each collimator 4 is arranged to collimate light from the corresponding LED 1 into a suitable angular range, typically less than ±30°, and a suitable area, typically with a diameter of a few mm. As an example, the collimator may be single cell LED concentrator lens. Such concentrator lenses suitable for standard LEDs are readily available, e.g. from Polymer Optics.

Several flexible optical wave guides, such as optical fibers 5, are connected to each collimator lens 4, each optical fiber having a first end in the focal plane of the lens 4. An appropriate number could be 10-100 for each LED in the case of PMMA fibers or around 10000 for each LED in the case of glass fibers having a diameter in the order of 50 μm.

A second end of each fiber 5 is arranged at an entrance aperture 6 of a beam shaping optics 7, so that light from all LEDs is guided by the fibers into the beam shaping optics, in order to provide a light beam of satisfactory quality. The beam shaping optics 7 may be arranged to further collimate the light from the light emitting elements (in addition to any collimation provided for by the collimators 4). As an example, the emitted light beam may have a full width at half maximum of around 10°-40°. The beam shaping optics 7 may also enable zooming of the light beam, and shape the light beam (e.g. "wash" beam, "hard edge spot" beam, etc.).

An example of such optics is provided by U.S. Pat. No. 6,200,002, herewith incorporated by reference. In this case, the beam shaping optics 7 is a tubular reflector, with a first end forming the entrance aperture 6, and the other end forming a larger exit aperture 13. The cross section of the tubular reflector may be polygonal, for example hexagonal, heptagonal or octagonal. The surface of each wall segment can be convex as seen from the optical axis.

A conventional beam shaping optics for entertainment applications typically has a ratio between entrance diameter (diameter of the entrance aperture 6) and exit diameter (diameter of exit aperture 13) of around 6-10. The total diameter of the lighting device is normally restricted to around 30 cm, which in turn limits the exit diameter of the optics. The entrance aperture will thus have a diameter in the order of 3-5 centimeters. According to the present invention, the area of the substrate 2 occupied by light emitting elements 1 entrance may be larger than the aperture 6 of the beam shaping optics 7. In other words, the fibers 5 collect light from a larger area and concentrate it into the smaller area of the entrance aperture 6.

According to one embodiment the light emitting elements comprise elements of different color, e.g. red, green and blue LEDs to allow generation of white light. In typical entertainment lighting applications, 4-8 different colors are required to enable generation of variable colored light. A color controller 8 may be arranged to control the color mix of the device. In this case, the fibers from various LEDs are preferably mixed with fibers from differently colored LEDs, so that a first color mixing is provided by the fibers. In FIG. 1, this is illustrated by the two LEDs 1a and 1b, and the fibers 5a and 5b, which ensure that light from the two LEDs is mixed with each other already at the entrance aperture 6 of the beam shaping optics 7. The mixing may be randomized, i.e. the large number of fibers directing from all LEDs may be randomly mixed at the entrance aperture. The beam shaping optics may be adapted to further improve the color mixing provided by the mixed fibers.

According to one embodiment, the device further comprises color feedback in order to enable the color controller to keep the relative light fluxes of differently colored LEDs equal to a calibrated value over lifetime and as a function of temperature. The feedback here comprises a color sensor, e.g. a photo diode 9, to which one of the fibers 10a, 10b from each LED is connected. The light flux of the photo diode 9 can then be feedback to the color controller 8, and be used to control the currents through the LEDs per color.

This can be implemented in at least two different ways. According to a first approach, illustrated in FIG. 1, one fiber 10a, 10b from each LED is connected to one single light sensor 9, which is arranged measure output of each color time-sequentially. This implementation has the advantage of being independent of aging of the light sensor. In the case of photo diodes, two different sensors may present different aging characteristics. As the same sensor is used for all colors, the relative intensities will not change, except for wavelength dependent aging.

Figure 2:
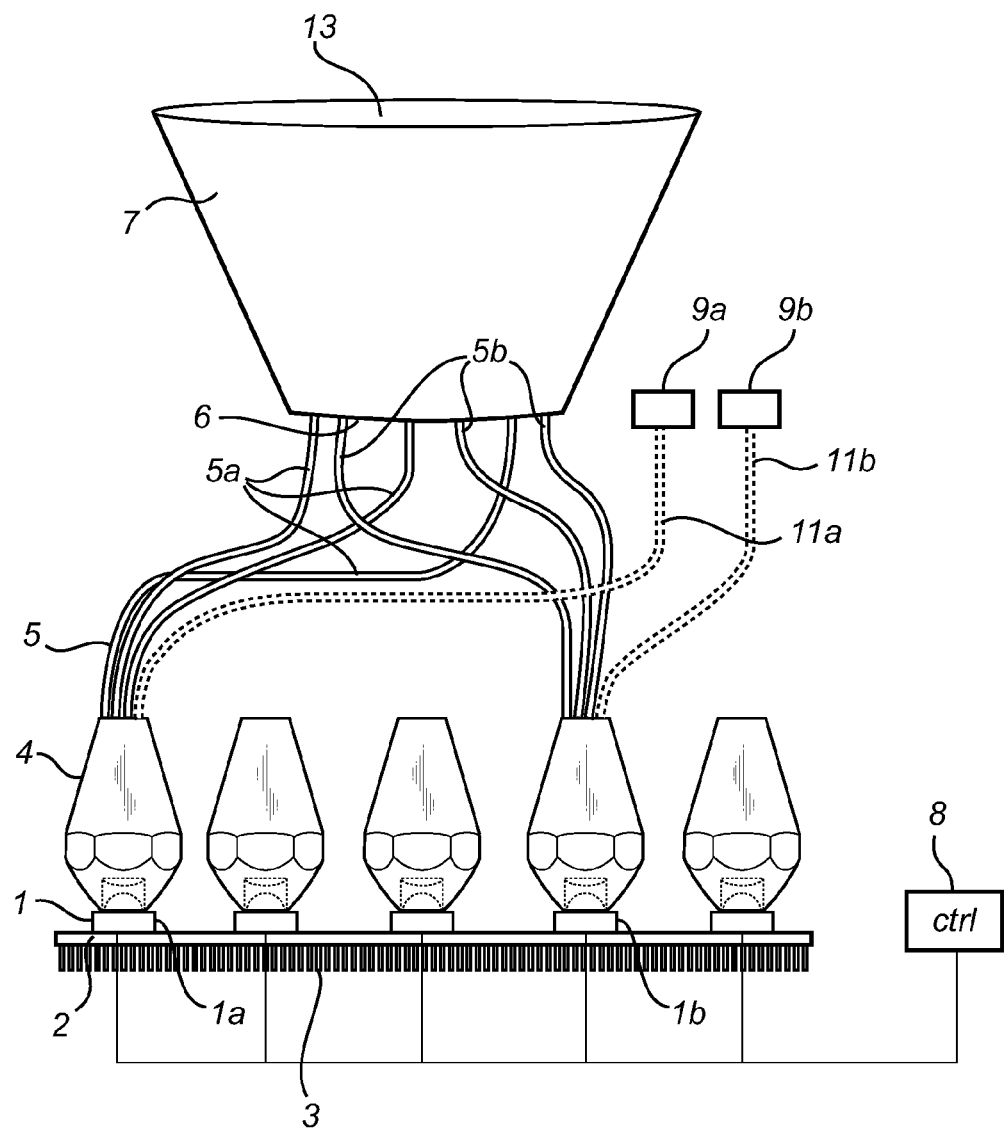
FIG. 2 shows a schematic view of a lighting device according to a second embodiment of the present invention.

According to a second approach, illustrated in FIG. 2, one sensor 9a, 9b is arranged for each color, enabling continuous flux monitoring. All fibers 11a, 11b connected to LEDs of the same color are connected to the same sensor 9a, 9b. This implementation requires less control circuitry, as no sequential timing control is required.

The person skilled in the art realizes that the present invention by no means is limited to the preferred embodiments described above. On the contrary, many modifications and variations are possible within the scope of the appended claims. For example, it is possible to further increase the flux/mm$^2$ at the entrance aperture 6 by inserting 2 or 3 colors in one fiber via one or two dichroic mirrors.

The invention claimed is:

1. A lighting device comprising
a plurality of solid state light emitting elements (1),
a beam shaping optics (7) having an entrance aperture (6),
a controller (8) for controlling a flux of said solid state light emitting elements by adjusting current to at least two of said solid state light emitting elements independently, and
a light sensor (9) connected to the controller (8),
each solid state light emitting element being optically connected to a set of optical fibers (5) each having a first end optically connected to said solid state light emitting element and a second end optically connected to said entrance aperture (6), so as to guide collimated light from the solid state light emitting element to the beam shaping optics (7),
additional optical fibers (10a, 10b; 11a, 11b) each having a first end optically connected to only one of said solid state light emitting elements and a second end optically connected to said light sensor (9), whereby each of said additional optical fibers provides to said light sensor only light from said solid state light emitting element so connected,
wherein information pertaining to light received by the sensor is derived by the sensor and used by the controller in said adjusting current, and
wherein said solid state light emitting elements are distributed over an area larger than said entrance aperture (6).

2. The lighting device according to claim 1, further comprising a heat sink (3), to which said solid state light emitting elements are thermally connected.

3. The lighting device according to claim 1, wherein the solid state light emitting elements are separated from neighboring solid state light emitting elements by a distance of at least 1 cm.

4. The lighting device according to claim 1, comprising more than 100 solid state light emitting elements.

5. The lighting device according to claim 1, wherein the solid state light emitting elements (1) include sets of solid state light emitting elements (1a, 1b) adapted to emit light of different colors, preferably at least four different colors.

6. The lighting device according to claim 5, wherein, at the beam shaping optics entrance aperture (6), the optical fibers (5a) of each set are mixed with optical fibers (5b) of other sets, so as to provide color mixing.

7. The lighting device according to claim 1, wherein the controller (8) is arranged to control relative flux of solid state light emitting elements having different color.

8. The lighting device according to claim 7, wherein the light sensor (9) is arranged to detect different colors time sequentially.

9. The lighting device according to claim 7, comprising a plurality of light sensors, and wherein all of said additional optical fibers (11a, 11b) which are connected to a particular light sensor (9a, 9b) are connected to solid state light emitting elements (1a, 1b) having the same color.

10. The lighting device according to claim 1, wherein each solid state light emitting element comprises a collimator lens arranged to collimate light emitted from the light emitting element, and wherein the first end of each optical fiber is optically connected to the collimator lens.

11. The lighting device according to claim 1, wherein the beam shaping optics (7) comprises a tubular reflector with a reflective inner surface, a first end of said reflector forming said entrance aperture (6) and a second end of said reflector forming an exit aperture (13) being larger than the entrance aperture (6).

12. The lighting device according to claim 1, wherein the optical fibers (5) have an index of refraction n being at least 0.5 larger than the index of refraction of a medium surrounding the fibers.

13. The lighting device according to claim 1, wherein the optical fibers (5) comprise at least one of PMMA fibers and glass fibers.

14. The lighting device according to claim 1, wherein each of the solid state light emitting elements is an LED.

* * * * *